(12) United States Patent
Hall et al.

(10) Patent No.: US 12,299,628 B2
(45) Date of Patent: *May 13, 2025

(54) NETWORK ARCHITECTURE PROVISIONING USING BUILD SHEETS

(71) Applicant: Truist Bank, Charlotte, NC (US)

(72) Inventors: Kenneth Hall, Roswell, GA (US); Bobby Len Robins, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/853,210

(22) Filed: Jun. 29, 2022

(65) Prior Publication Data

US 2024/0005268 A1    Jan. 4, 2024

(51) Int. Cl.
*H04L 41/12*    (2022.01)
*G06Q 10/087*    (2023.01)

(52) U.S. Cl.
CPC ................... *G06Q 10/087* (2013.01)

(58) Field of Classification Search
CPC .................................................. G06Q 10/087
See application file for complete search history.

(56) References Cited

U.S. PATENT DOCUMENTS

| 8,914,478 | B2* | 12/2014 | Acuna | G06F 3/067 |
| | | | | 717/171 |
| 11,018,949 | B2* | 5/2021 | Ramasamy | H04L 41/22 |
| 11,855,852 | B1* | 12/2023 | Hall | H04L 41/22 |
| 2009/0300580 | A1* | 12/2009 | Heyhoe | G06F 8/70 |
| | | | | 717/124 |
| 2011/0202317 | A1* | 8/2011 | Brown | G06F 30/18 |
| | | | | 703/1 |
| 2013/0212556 | A1* | 8/2013 | Heyhoe | G06F 8/71 |
| | | | | 717/106 |
| 2016/0077809 | A1* | 3/2016 | Heyhoe | G06F 8/45 |
| | | | | 717/106 |
| 2021/0012200 | A1* | 1/2021 | Lyske | G06V 10/82 |
| 2021/0120023 | A1* | 4/2021 | Gupta | H04L 63/1433 |
| 2023/0403200 | A1* | 12/2023 | Hall | H04L 41/082 |
| 2023/0403202 | A1* | 12/2023 | Hall | G06F 3/04817 |
| 2024/0056363 | A1* | 2/2024 | Hall | G06F 3/0486 |

\* cited by examiner

*Primary Examiner* — Talia F Crawley
(74) *Attorney, Agent, or Firm* — Kilpatrick Townsend & Stockton LLP; Michael A. Springs, Esq.

(57) ABSTRACT

Some examples of the present disclosure relate to a network architecture provisioning tool. In one example, a computer system may receive a build sheet specifying a computer network architecture and including a component inventory and configuration information usable to provision the computer network architecture. The computer system can generate a build ticket for a component of the component inventory. The computer system can use the build ticket to determine an orchestration script for provisioning the component within a computer network corresponding to the network architecture. The computer system can initiate execution of the orchestration script to provision the component in the computer network.

20 Claims, 6 Drawing Sheets

NETWORK ARCHITECTURE PROVISIONING USING BUILD SHEETS

TECHNICAL FIELD

The present disclosure relates generally to network infrastructure deployment. More specifically, but not by way of limitation, this disclosure relates to a network architecture provisioning tool usable to deploy a network infrastructure.

BACKGROUND

Many computer systems are designed to meet the requirements of the applications, services, and other software they support. Deploying new applications into a computer system may require modifications to the computer system, including the provisioning and configuration of new infrastructure. Distinct parts of the infrastructure, for example storage and compute servers, may be automatically provisioned, with network engineers providing coordination and manual configuration to ensure interoperability according to the requirements of the application being deployed.

SUMMARY

One example of the present disclosure includes a method involving receiving a build sheet for a computer network architecture. The build sheet can include a component inventory for the computer network architecture and configuration information usable to provision the computer network architecture. The method can involve generating a build ticket for a component of the component inventory. The build ticket can comprise a portion of the configuration information usable to provision the component. The build ticket can be separate from the build sheet. The method can involve determining, using the build ticket, an orchestration script for provisioning the component. The orchestration script can comprise provisioning tasks corresponding to the portion of the configuration information. The orchestration script can be separate from the build ticket. The method can involve initiating execution of the orchestration script to provision the component. Some or all of the method can be implemented by a processor.

Another example of the present disclosure includes a computer system comprising a processor and a memory. The memory can store computer-executable instructions that are executable by the processor for causing the computer system to perform operations. The operations can include receiving a build sheet for a computer network architecture. The build sheet can include a component inventory for the computer network architecture and configuration information usable to provision the computer network architecture. The operations can include generating a build ticket for a component of the component inventory. The build ticket can comprise a portion of the configuration information usable to provision the component. The build ticket can be separate from the build sheet. The operations can include determining, using the build ticket, an orchestration script for provisioning the component. The orchestration script can comprise provisioning tasks corresponding to the portion of the configuration information. The orchestration script can be separate from the build ticket. The operations can include initiating execution of the orchestration script to provision the component.

Another example of the present disclosure includes a non-transitory computer-readable storage medium storing instructions that are executable by a processor for causing a computer system to perform operations. The operations can include receiving a build sheet for a computer network architecture. The build sheet can include a component inventory for the computer network architecture and configuration information usable to provision the computer network architecture. The operations can include generating a build ticket for a component of the component inventory. The build ticket can comprise a portion of the configuration information usable to provision the component. The build ticket can be separate from the build sheet. The operations can include determining, using the build ticket, an orchestration script for provisioning the component. The orchestration script can comprise provisioning tasks corresponding to the portion of the configuration information. The orchestration script can be separate from the build ticket. The operations can include initiating execution of the orchestration script to provision the component.

DETAILED DESCRIPTION

Certain aspects and features of the present disclosure relate to a provisioning engine configured to automatically provision computer infrastructure components with minimal manual intervention. The provisioning engine can generate build tickets from a build sheet for a computer network architecture. A build ticket may include configuration information and instructions for provisioning one or more components of a network architecture. In particular, the build ticket may specify the provisioning of related components within the network architecture and track the provisioning tasks as they are completed. Such tracking allows for change control within the network architecture during provisioning of the computer system while ensuring that components that depend on each other in the computer system are provisioned correctly without the need for manual orchestration of the provisioning tasks. The provisioning engine may place the build tickets into a ticketing system. The provisioning may then pull build tickets from the ticketing system to use during provisioning of a computer system.

A build sheet, in comparison, may be a technical specification and configuration information for some or all of the components of an entire network architecture. The components can include both hardware and software infrastructure of a computer system, including servers, storage devices, network devices, virtual machines, and the like. The provisioning engine can use the "complete picture" of the network architecture provided by the build sheet to intelligently and efficiently generate build tickets for the automatic provisioning of the components.

The build sheet may be generated by a computer system implementing a computer network design application that can allow a network architect to design a network architecture with a graphical user interface (GUI). The network design application can include several template objects for various components of the computer network, with each template object having default parameters for a corresponding component. The default parameters for a template object can be modified by the network architect to specify the configuration of the component according to the requirements of the network design. The network design application can then automatically generate the build sheet by extracting the configuration information from the parameters for each component and assembling the configuration information into a table or other suitable data structure.

After generating the build tickets based on the build sheet, the provisioning engine can use the build tickets to select appropriate orchestration scripts for provisioning the components of the network architecture. The orchestration scripts can include predefined provisioning tasks that are executable by the computer system to provision the components. The provisioning tasks may be defined as programs or program code executable by a processor to implement the corresponding task. For example, provisioning an application server can include implementing a virtual machine (VM) on a computing device to host the application server software, with the VM configured to have available a certain number of processors, a quantity of memory, and a set amount of local storage. An orchestration script for this application server can include tasks to create the specified VM on the computing device with the appropriate configuration. The build ticket may specify that the orchestration script should be executed at a particular computing device, or at a particular data center containing various computing devices. The provisioning engine can use that information in the build ticket to select a destination at which to execute the orchestration script and coordinate with the destination to initiate execution of the orchestration script. Additionally or alternatively, the provisioning engine can determine the destination using other techniques and coordinate with the destination to initiate execution of the orchestration script.

The techniques described herein may provide several advantages over conventional methods of infrastructure provisioning. Automated generation of a build sheet can reduce errors resulting from multiple manual inputs to specify a network component inventory. Generating separate build tickets from the build sheet can further reduce computational overhead by orchestrating the provisioning of different components in an efficient manner. For example, build tickets may allow for better tracking and coordination of the provisioning process (e.g., so that multiple components can be provisioned in parallel or in sequence as needed). As one particular example, a server component that depends on the successful provisioning of a storage component may be provisioned after the storage component. Moreover, using a build sheet, which may describe the entire network architecture, reduces the amount of manual operations to coordinate the provisioning different components. Reducing the need for manual steps in provisioning the infrastructure reduces the likelihood of configuration errors in the computer system, improving performance of the computing resources within the network. Additional advantages will be made clear to one skilled in the art upon reviewing the remainder of this disclosure.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
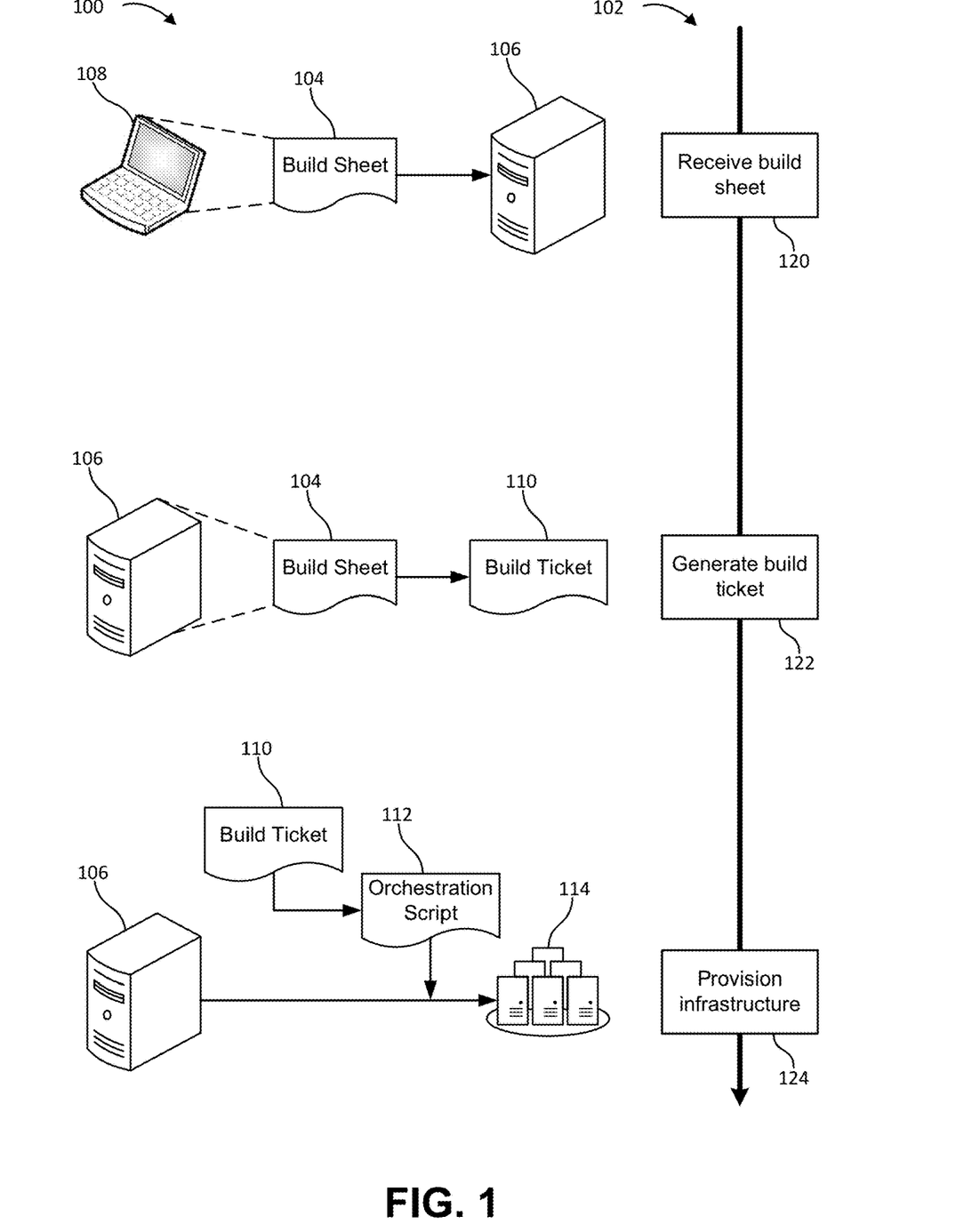
FIG. 1 is a block diagram and associated flow chart of an example process to generate a build ticket from a build sheet for provisioning a computer infrastructure, according to some aspects of the present disclosure.

FIG. 1 is a block diagram 100 and associated flow chart of an example process 102 to generate a build ticket from a build sheet for provisioning a computer infrastructure according to some aspects of the present disclosure. The diagram depicts a computer system 106 that can perform the operations of process 102. The computer system 106 may be a server device configured to run a provisioning engine. The computer system 106 can include additional computing devices, including multiple server devices, or may be an example of a distributed computing system or cloud computing system that can implement a provisioning engine for performing one or more operations of process 102. For example, the computer system 106 may be connected to computing devices within a data center for configuring and/or provisioning the computing devices. Additional details about computer systems that are capable of performing the techniques of this disclosure are provided below with respect to FIG. 4.

The process 102 begins at block 120 with the computer system 106 receiving a build sheet 104. The build sheet 104 may be received from another computing system 108. Computing system 108 may be implement a network design application that is configured to allow a network architect or engineer to design a computer network architecture and generate a build sheet. The network design application can be a special-purpose drafting or visualization application specifically created for designing network architectures. The network design application can include a graphical user interface (GUI) that allows the network architect to position (e.g., drag and drop) template objects representing various network components onto a canvas and define the parameters for the components. The parameters of the component can include, for example, the type, number of processors, memory, operating system, installed applications, and the like. The network design application can allow the network architect to interact with the template object to display the parameters as a drop-down menu within the GUI of the network design application. The network architect can then modify the parameters of the component according to the desired network design. The network design application can then automatically generate a build sheet that includes the parameters as configuration information for the components of the network architecture.

At block 122, the computer system 106 can use the build sheet 104 to generate a build ticket 110. The build ticket 110 can correspond to one component of the network architecture specified in the build sheet 104. As an illustrative example, the build sheet 104 can include a component inventory that includes a web server and a database server, with configuration information that can be used to provision each server. The build ticket 110 can correspond to provisioning the web server and contain a portion of the configuration information that is usable to provision the web server. The portion of the configuration information can be extracted from the build sheet 104 and stored in the build ticket 110, which can be distinct from the build sheet 104. The build ticket 110 may also be populated with additional information that is absent from the build sheet 104. In some examples, the build sheet 104 and the build ticket 110 can be text files that include their respective configuration information. In some examples, the build ticket 110 can correspond to more than one component of the network architecture. Using the example above, the database server may be related to a storage device providing block storage within the network architecture. Because the database server may depend on a sufficient amount of block storage being available for use, the build ticket 110 may include configuration information for provisioning both the storage device and the database server as components of the network architecture.

At block 124, the computer system 106 can provision the infrastructure of a network architecture. Provisioning the infrastructure can include provisioning a component as specified by the build ticket 110. The computer system 106 can use the build ticket 110 to select an orchestration script 112 corresponding to the component. The orchestration script 112 can include one or more provisioning tasks for the component. For example, the component may be a web server with four processing cores and 32 GB of dynamic memory available and running server software. The provisioning tasks can then include a task for launching a VM on a server rack in a data center that has at least four available processors and 32 GB of dynamic memory, with the VM being assigned the specified four processors and 32 GB of memory. The provisioning tasks can also include installing an operating system (OS) and the server software onto the VM. The provisioning tasks of an orchestration script are not limited to provisioning virtual devices and may include tasks for provisioning bare metal computing devices.

The computer system 106 can select the orchestration script 112 from among several available orchestration scripts by using information in the build ticket 110. For example, the computer system 106 can access a lookup table that assigns available orchestration scripts to corresponding components. Based on a component specified in the build ticket 110, the computer system 106 can select the orchestration script by the corresponding assignment in the lookup table. As another example, the computer system 106 can employ a machine learning model to determine the orchestration script 112. The machine learning model can be trained using data that describes the provisioning of existing infrastructure components. The machine learning model can take as input the build ticket 110 and, based on the configuration information in the build ticket 110, output a selection for an orchestration script that is predicted to be the appropriate orchestration script for the component. As a further example, in some instance the build ticket 110 may explicitly identify a corresponding orchestration script for the computer system 106.

The orchestration script 112 may be a predefined script, such that the included provisioning tasks are standardized for the type of component to be provisioned but configurable based on the specifications for a particular component. For example, there may be an orchestration script for provisioning web servers and application servers within a computer network, so that the same script can be used to provision different application servers. The differences can be accounted for by inputting different configuration information into the orchestration script from, for example, the build ticket 110. In some examples, the computer system 106 can receive additional configuration information for the component that can be used to modify the orchestration script 112 before it is executed to provision the component.

Figure 2:
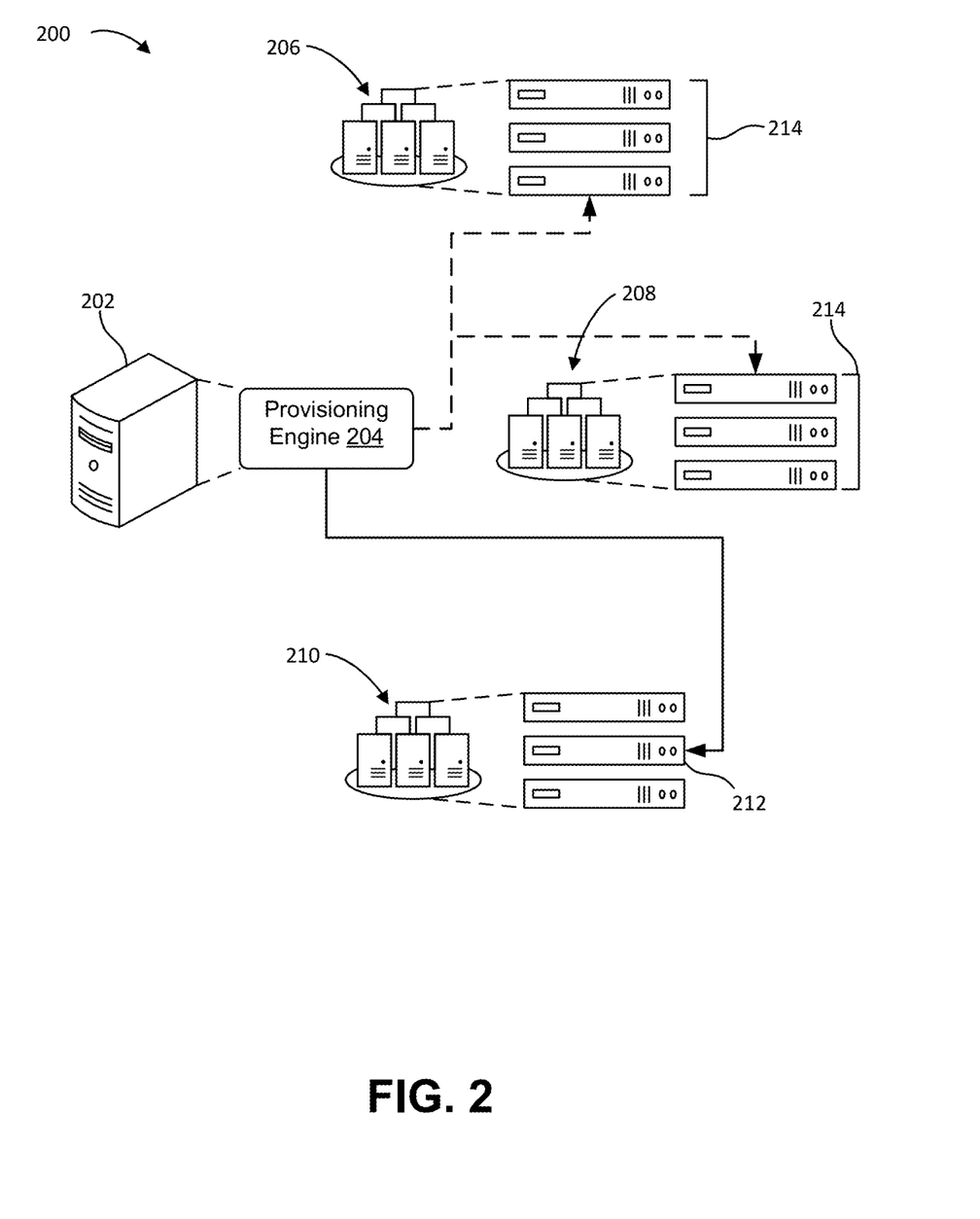
FIG. 2 is another block diagram of a computer system and provisioning engine that can provision computer infrastructure from a build ticket, according to some aspects of the present disclosure.

FIG. 2 is another block diagram of a computer system 202 and provisioning engine 204 that can provision computer infrastructure from a build ticket according to some aspects of the present disclosure. As described above, the build ticket can include configuration information for a component of a computer network architecture specified in a build sheet. Depending on the architecture, the component to be provisioned by provisioning engine 204 may be located in one of several data centers 206-210. For example, a network architecture may have servers in a test environment and other servers in a production environment, with the test environment located within data center 206 and the production environment located within data center 210. The build ticket for the component can include configuration information that specifies the environment for the component, including a particular data center that contains the corresponding physical resource for the component. The data centers 206-210 do not necessarily represent separate physical facilities and may instead represent logical collections of computing resources.

As depicted in FIG. 2, data center 206 and data center 208 can each include a plurality of physical resources 214, which could be server devices or other similar computing devices, network devices including switches, routers, and gateways, storage devices, and the like. The provisioning engine 204 can use the build ticket to determine in which environment the component should be provisioned. For example, the configuration information in the build ticket may explicitly specify a particular data center, logical network division within a data center, or other environment for provisioning the component. In another example, the provisioning engine 204 can use configuration information in the build ticket that specifies the component to determine the environment. For instance, a particular load balancer may only be suitable to provision within a test environment rather than a production environment.

The provisioning engine 204 can select an orchestration script for provisioning the component in the environment. For example, the provisioning engine 204 can use a build ticket generated from a build sheet to provision a web server on server device 212 within data center 210, as indicated by the solid arrow. The provisioning engine 204 can generate additional build tickets from the same build sheet to provision components in the environments of data center 206 and data center 208, as indicated by the dashed arrows. In some cases, the provisioning engine 204 can use a single build ticket to provision a component in one environment and a related component in a separate environment. For example, an application server may be provisioned in data center 210 while related storage may be provisioned in data center 208. Relationships, including dependencies, between components within the network infrastructure may be specified by configuration information in the build sheet, which in turn may be specified by relationships defined within the network design application. In another example, the relationships between components may be specified in a predefined lookup table that can map a component to a related component. If the provisioning engine 204 provisions a component, the provisioning engine 204 can then use the lookup table to determine a related component to also provision.

Figure 3:
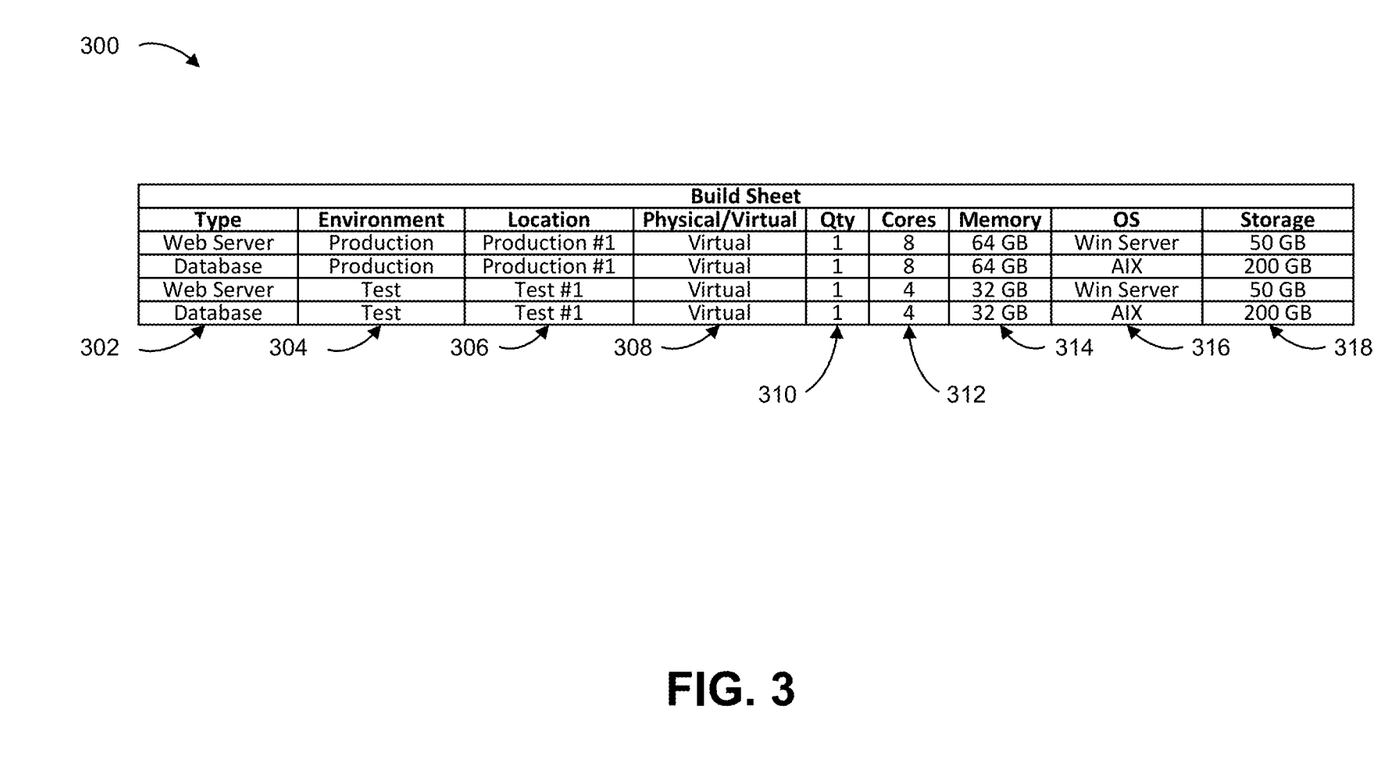
FIG. 3 depicts a portion of an example build sheet, according to some aspects of the present disclosure.

FIG. 3 depicts a portion of an example build sheet 300. The build sheet 300 is depicted as a table, but the data of the build sheet 300 may be stored as any suitable data structure, such as a table, array, list, object, etc. The build sheet 300 can include configuration information for some or all of the components in a network architecture design. The configuration information in the build sheet 300 may partially or completely specify the infrastructure components corresponding to the architecture design. As exemplified in FIG. 3, the build sheet 300 includes configuration information for two web servers and two database servers to be provisioned in a production environment and a test environment.

The build sheet 300 can include a component inventory with each component's configuration information. The configuration information can include the type 302 of infrastructure component including web servers, application servers, database servers, databases, storage devices, and so on; the environment 304 for the component, including production, test, or other logical environments; and the location 306 of the component, which can include an available data center for hosting the component. The configuration information can also include whether the infrastructure component is physical or virtual 308, the quantity 310 of infrastructure components, the number of processor cores 312, the amount of dynamic memory 314, the operating system 316, the amount of allocated storage 318, whether the components form a computing cluster, available file sharing directories, locations of volume mount points, whether the component is in an exposed environment within the proposed network (e.g., within a "demilitarized zone" (DMZ) subnetwork), or any combination of these. The build sheet 300 can also specify other information, such as one or more applications to be deployed on the infrastructure components to support the function of the component. For example, a database server may use a server application (e.g., Microsoft SQL Server). The build sheet 300 may also include information identifying responsible parties or reviewing, approving, and/or implementing the proposed architecture. Examples of the responsible parties may include engineers, technicians, network architects, and the like.

The configuration information contained in the build sheet 300 may be used by a provisioning engine to generate one or more build tickets for automatically provisioning the components. For example, the build ticket may be usable by the provisioning engine to select and initiate an orchestration script to provision a given component. The provisioning engine may be communicatively connected to available infrastructure hardware, such as one or more computing devices in a data center. The orchestration script can then allocate hardware for the corresponding networking component described by the build ticket generated from build sheet 300. For example, the configuration information for the component can be used to determine which device has the correct number of available processor cores and amount of available dynamic memory to support the component, which OS and server application to install, and whether the component is in the DMZ and has specific host name.

The component inventory may include explicitly defined components, as represented by the rows of the table of build sheet 300. The component inventory may also include implicitly defined components. For example, a storage device used by the database server may be implicitly defined by the configuration information for the database server. For example, the web server and database server for the "Production" environment have configuration information specifying 50 GB and 200 GB of storage, respectively. To adequately provision the database server, the provisioning engine can generate a build ticket from build sheet 300 for a storage device in the "Production" environment that has at least 200 GB of available storage. The build ticket can also include configuration information for provisioning the database server as a component related to the storage component. In this way, one build ticket can be used to provision infrastructure components that depend on one another. The provisioning engine can update the build ticket to track the successful provisioning of the components as the corresponding orchestration scripts are completed. Updating the build ticket can include adding information to the build ticket that indicates that the provisioning of one or more components has been completed. The ability of the provisioning engine to generate build tickets for both explicitly and implicitly defined components of the component inventory in a build sheet allows for the efficient utilization of physical resources by avoiding potentially provisioning redundant components, including storage components.

Figure 4:
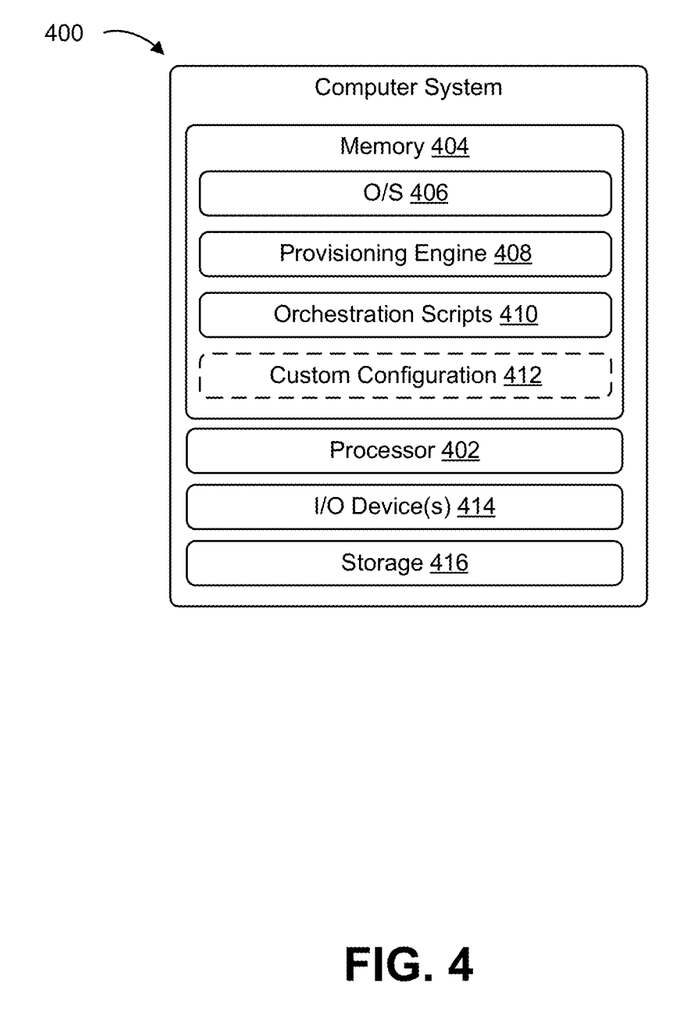
FIG. 4 is a block diagram of an example computer system, including a plurality of modules that may perform functions in accordance with at least one aspect of the present disclosure.

FIG. 4 is a simplified block diagram of an example computer system 400, including a plurality of modules that can perform one or more of the techniques described in this disclosure. The computer system 400 may be an example of other computer systems described herein for implementing a provisioning engine, including computer system 106 of FIG. 1. The computer system 400 can have at least one processor 402, a memory 404, and one or more input/output ("I/O") devices 414. The I/O device(s) 614 can include displays, monitors, touch screens, a mouse, a keyboard, or other suitable I/O devices.

The processor 402 can include one processing device or multiple processing devices. Non-limiting examples of the processor 402 include a Field-Programmable Gate Array (FPGA), an application-specific integrated circuit (ASIC), or a microprocessor. The processor 402 can execute instructions stored in the memory 404 to perform operations. In some examples, the instructions can include processor-specific instructions generated by a compiler or an interpreter from code written in any suitable computer-programming language, such as C, C++, C #, and Java.

Memory 404 can include one memory device or multiple memory devices. The memory 404 may store program instructions that are loadable and executable on the processor 402, as well as data generated during the execution of these programs, including build sheets, build tickets, orchestration scripts, and the like. Depending on the configuration and type of computer system 400, the memory 404 may be volatile (such as random access memory ("RAM")) or non-volatile (such as read-only memory ("ROM"), flash memory, etc.). In some implementations, the memory 404 may include multiple different types of memory, such as static random access memory ("SRAM"), dynamic random access memory ("DRAM"), or ROM.

The computer system 400 may also include additional storage 416, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In these embodiments, the storage 416 may be utilized to store data contents received from one or more other devices, including build sheets, build tickets, orchestration scripts, and nonstandard component configurations.

In some embodiments, the computer system 400 can include more than one computing device, including a user device and a server device. For example, the computer system can include a provisioning server at each data center, such that orchestration scripts may be executed within the local environment for provisioning the components of the network infrastructure. The orchestration scripts may be stored at a central provisioning server and transmitted over a network to the provisioning servers. Examples of the networks can include the Internet, wireless networks, cellular networks, and other private and/or public networks. User devices may be used to allow a user interface with the provisioning engine to manually view or modify orchestration scripts, build sheets, and build tickets.

The memory 404 may include an operating system 406 and one or more application programs, modules, or services for implementing the features disclosed herein, including a provisioning engine 408, orchestration scripts 410, and custom configurations 412. In some examples, the provisioning engine 408 may be configured to receive a build sheet and use the build sheet to generate one or more build tickets for the components specified in the build sheet. The provisioning engine 408 can use a build ticket to select an orchestration script and initiate execution of the orchestration script to provision the corresponding component. The orchestration script may be selected from a set of orchestration scripts 410 stored at the computer system 400 or elsewhere. The set of orchestration scripts may include predefined orchestration tasks for provisioning and configuring network architecture components. For example, an orchestration script may include orchestration tasks for provisioning an application server, such that the same application-server orchestration script can be selected and executed to provision any application server identified in the build ticket. Different application servers can then be provisioned by incorporating the configuration information for the specific application server from the build ticket.

In some examples, the build tickets and/or orchestration scripts 410 can involve the provisioning of standardized components of the network architecture. For instance, an orchestration script can involve the provisioning of a standardized application server, which may have a default configuration of four processors and 32 GB of dynamic memory. Another orchestration script can involve the provisioning of another standardized application server, which may have a standardized default of 8 processors and 64 GB of dynamic memory. As used herein, the term "standardized component" may refer to a computer network component that has standardized (e.g., predefined) settings. Standardizing a component's settings can make the component easier and faster to deploy, without having to specify the individual settings each time in each build ticket or orchestration script. For example, computing devices for servers may be available with predefined sets of processors and memory, including one processor core and 8 GB of dynamic memory, 2 cores/16 GB, 4 cores/32 GB, 8 cores/64 GB, 16 cores/256 GB. These arrangements of processor/memory specifications (and/or any other combinations of component parameters) may be considered "standard." By contrast, configurations that include arrangement of specifications not in the predefined set may be considered "nonstandard." For example, a computing device with 16 cores/512 GB may be nonstandard if the configuration was not predefined.

Whether a configuration is standard may be determined by a network design application used to generate the build sheet. If a network architecture is designed using an existing template object for a component, the component may be a standard component for the architecture. If a network architect creates a new component to satisfy the requirements of the network design, the new component may be nonstandard. The build sheet can contain an indication that a component is standard or nonstandard.

Because the set of orchestration scripts 410 may include orchestration tasks involving standard components, if a nonstandard component is included in the build sheet, the provisioning engine 408 may not be able to select an appropriate orchestration script. Instead, the provisioning engine 408 can use the build ticket for the nonstandard component to obtain a custom configuration 412 for the nonstandard component. The custom configuration 412 can include a new orchestration script for the nonstandard component or a modification (e.g., update) to an existing orchestration script of the set of orchestration scripts 410. In one example, the custom configuration 412 may be obtained in response to a request generated by the provisioning engine 408.

The custom configuration 412 may be generated by a network design application based on input from a network architect. For example, the network architect may create a new template object in the network design application for a new type of server. Based on the parameters of the new template object, custom configuration for a new orchestration script can be generated either manually by the network architect or automatically by the network design application. If automatically generated, the computer system hosting the network design application may implement a model to predict modifications to an existing orchestration script that can be used to provision the component specified by the new template object. Using the example above of a new type of server, the model may generate a proposed modification of an existing orchestration script that is used to provision a standard server.

Figure 5:
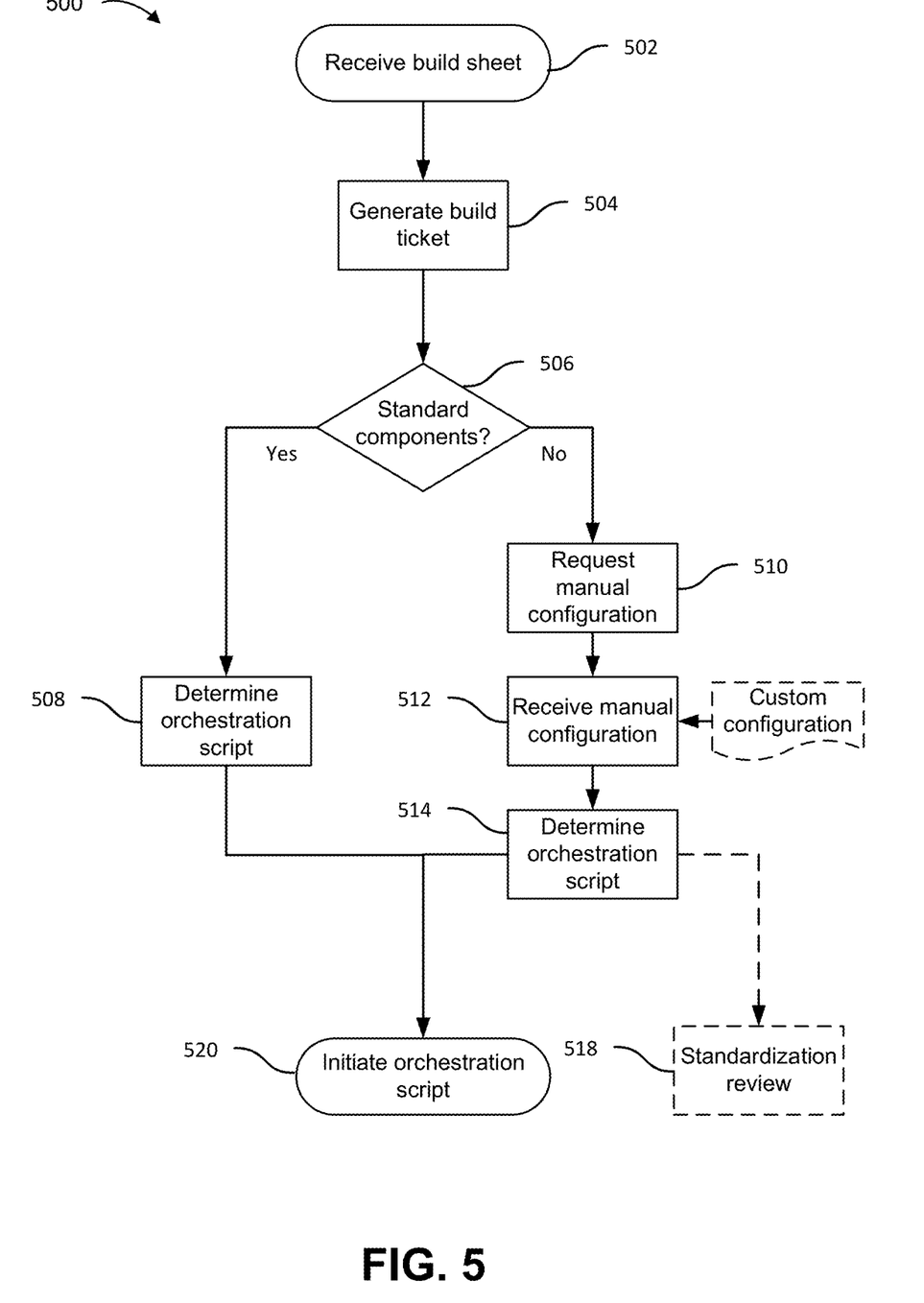
FIG. 5 is a flow diagram of an example process for determining if a build ticket includes nonstandard infrastructure components and obtaining additional configuration for the nonstandard components, according to some aspects of the present disclosure.

FIG. 5 is a flow diagram of an example process 500 for determining if a build ticket includes nonstandard infrastructure components and obtaining additional configuration for the nonstandard components, according to some embodiments. The process 500 may be performed by computer system 400 of FIG. 4 implementing a provisioning engine as described herein. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At the start point 502, the computer system can receive a build sheet specifying the components of a network infrastructure. The computer system can then generate a build ticket for one component using the build sheet, at block 504. At decision 506, the computer system can determine whether the build ticket corresponds to a standard component. In some cases, the build ticket may explicitly identify whether the component is a standard component. In other cases, the computer system may use additional information (e.g., a lookup table, a list from a network design application of all template objects) that describes all available standard components for a network architecture. If so, then the computer system can proceed to determine an orchestration script at 508. Determining the orchestration script can include selecting an orchestration script from among several available orchestration scripts, with the orchestration script selected based on a correspondence between the component and configuration information in the build ticket and the orchestration tasks in the orchestration script.

If the build ticket does not correspond to a standard component and instead corresponds to a nonstandard component, the computer system can request manual configuration, at block 510. The request may be sent to a user device, for instance an operations console, that can provide an interface for a network engineer to provide a custom configuration for provisioning the nonstandard component. The custom configuration can be an update to an existing orchestration script or a new orchestration script for the nonstandard component. At block 512, the computer system can receive the manual configuration. At block 514, the computer system can determine the orchestration script, which can include selecting the orchestration script that was provided or updated by the manual configuration at block 512. Once an orchestration script has been determined, the computer system can initiate the orchestration script at endpoint 520.

In some examples, the computer system can provide an indication that a nonstandard component was provisioned using a custom configuration at block 518. The indication can prompt a standardization review of the nonstandard component, the custom configuration, and/or nonstandard orchestration script, which can result in the nonstandard component being approved as a standard component of subsequent build sheets. For example, the nonstandard component may, after review, be included as a standard component in the network design application. When the computer system receives another build sheet having the newly standardized component, the build ticket generated from that build sheet can indicate that the component is a standard component.

Figure 6:
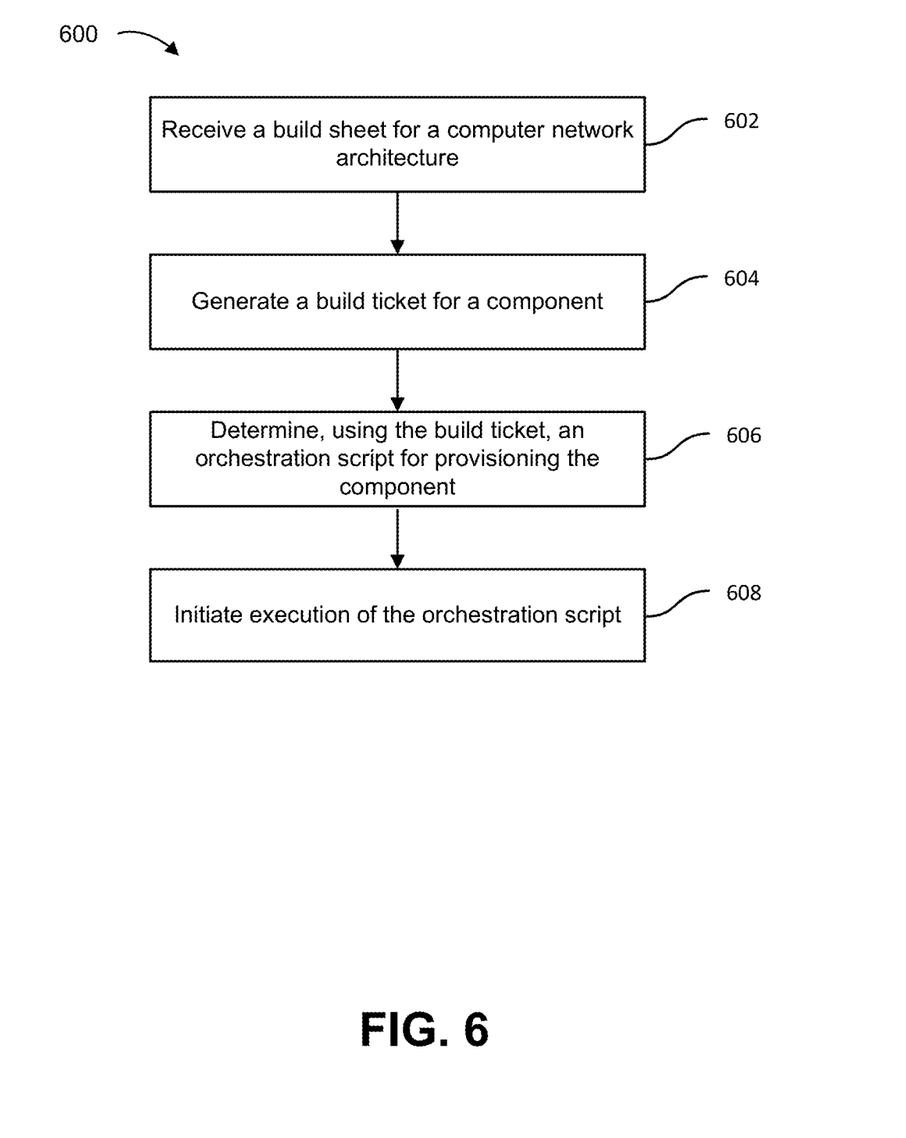
FIG. 6 is a flow diagram of an example process for generating a build ticket for a component and provisioning the component with an orchestration script, according to some aspects of the present disclosure.

FIG. 6 is a flow diagram of an example process 600 for generating a build ticket for a component and provisioning the component with an orchestration script according to some aspects of the present disclosure. The process 600 can be performed by any of the computer systems described herein configured to implement a provisioning engine, including computer system 400 of FIG. 4.

The process 600 can begin at block 602, with the computer system receiving a build sheet for a computer network architecture. The build sheet can include a component inventory for the computer network architecture. The build sheet can also include configuration information for each component of the component inventory. As described above, the components of the computer network architecture can include computing devices, networking equipment, storage devices, and the like. The configuration information can include parameters (e.g., number of processors, amount or memory, OS, etc.) for the components usable to provision the computer network architecture.

At block 604, the computer system can generate a build ticket for a component using the build sheet. For example, the computer system can extract a portion of the configuration information corresponding to the component from the build sheet and use the configuration information to populate the build ticket. The portion of the configuration information can specify the parameters to configure the component.

In some examples, the computer system can identify a dependency of the component described in the build sheet. As described above with respect to FIG. 2, dependencies between components within the network infrastructure may be specified by configuration information in the build sheet or in a predefined lookup table, dependency tree, graph, or other similar data structure that can map a component to a related component and is accessible by the computer system. The dependency may be another component on which the component described in the build sheet depends. For example, a build sheet may describe a database server, which may depend on the availability of a certain amount of storage from a storage device. Based on identifying this dependency, the computer system can select the storage device from the component inventory and determine additional configuration information (e.g., from the build sheet) that corresponds to the storage device (e.g., the minimum amount of storage to allocate). The computer system can then incorporate that additional configuration information into the build ticket. Alternatively, the computer system may automatically generate another build ticket that includes the additional configuration information for provisioning the storage device.

Generating the build ticket can also, in some examples, include determining that a physical resource is available for hosting the component. For example, the component may be a web server, so the computer system can determine that a server device in a data center is available to host the web server. Based on the physical resource, the computer system can determine additional configuration information (e.g., from the build sheet) that corresponds to the physical resource. The computer system can then incorporate the additional configuration information into the build ticket or another, separate build ticket for provisioning the physical resource.

At block 606, the computer system can use the build ticket to determine an orchestration script. The orchestration script can include one or more provisioning tasks corresponding to the configuration information. For example, a provisioning task can include launching a VM on a server device that has a number of processors and amount of dynamic memory specified by the configuration information. Determining the orchestration script can include selecting the orchestration script from a set of orchestration scripts. In one example, determining an orchestration script can include determining that the component in the build ticket is a nonstandard component and requesting updated provisioning tasks for the nonstandard component. The updated provisioning tasks may be a custom configuration of a new orchestration script or updates or additions to an existing orchestration script. The updated provisioning tasks may be received from another computer system that can generate the updated provisioning tasks with manual input or may store the updated provisioning tasks.

At block 608, the computer system can execute the orchestration script. Executing the orchestration script can include executing the one or more orchestration tasks at a physical resource to host the component. Executing the orchestration script can also include applying some or all of the portion of the configuration information to the physical resource to configure the component as part of the network architecture.

In some examples, the computer system can also update the build ticket. After the component has been successfully provisioned, the computer system can receive an indication that the provisioning was successful. In response, the computer system can update the build ticket by identifying a related component from the build sheet that depends on the provisioned component and selecting another portion of the configuration information from the build sheet. The updated build ticket can then be used to provision the related component. Alternatively, the computer system can update the build ticket with an indication that the ticket is complete and generate (or retrieve from a ticketing system) a new build ticket to provision the related component. In this way, the computer system can provide tracking and change control of related components as they are provisioned to ensure that dependencies are correctly established between the components.

In some examples, the computer system can also update an inventory of physical resources based on the provisioning of a component. For example, the inventory of physical resources may represent the available resources of a data center. If a server device is provisioned to host a web server, the computer system can update the inventory to indicate that the server device may no longer be available to host additional components. The computer system can use the inventory to determine if a physical resource is not available to host additional components. If physical resources are not available to host a component in the build sheet, the computer system can generate a procurement request to have the physical resource made available. The procurement request may be used by operations personnel to install additional physical resources within an environment.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A method comprising:
   receiving, by a processor, a build sheet for a computer network architecture, the build sheet comprising a component inventory for the computer network architecture and configuration information usable to provision the computer network architecture;
   generating, by the processor, a build ticket for a component of the component inventory, the build ticket comprising a portion of the configuration information usable to provision the component, the build ticket being separate from the build sheet;
   determining, by the processor using the build ticket, an orchestration script for provisioning the component, the orchestration script comprising provisioning tasks corresponding to the portion of the configuration information, the orchestration script being separate from the build ticket; and
   executing, by the processor, the orchestration script to provision the component.

2. The method of claim 1, further comprising receiving, by the processor, an indication that the component was successfully provisioned;
   responsive to the indication, determining, by the processor and using the build sheet, a related component of the component inventory, the related component being dependent on the component being successfully provisioned;
   generating, by the processor, an additional build ticket for the related component of the component inventory, the additional build ticket comprising another portion of the configuration information usable to provision the related component; and
   marking, by the processor, the build ticket as complete.

3. The method of claim 1, wherein generating the build ticket comprises:
   determining, by the processor using the build sheet, a dependency of an additional component of the component inventory on the component;
   selecting, by the processor and based on the dependency, the component from the component inventory;
   determining, by the processor, the portion of the configuration information corresponding to the component; and
   configuring, by the processor, the build ticket to include the portion of the configuration information.

4. The method of claim 1, wherein generating the build ticket comprises:
   determining, by the processor, a physical resource available for hosting the component; and
   determining, by the processor, the portion of the configuration information corresponding to a configuration of the physical resource.

5. The method of claim 4, wherein the build sheet is generated using a network design application having a drag and drop canvas, the network design application including template objects representing computer infrastructure components of the component inventory, each template object comprising a configuration of the corresponding computer infrastructure component and being individually positionable on the drag and drop canvas.

6. The method of claim 1, wherein determining the orchestration script based on the build ticket comprises:
   determining, by the processor, whether the component is a nonstandard component;
   based on a determination that the component is the nonstandard component, sending, by the processor, a request for customized provisioning tasks;
   receiving, by the processor, the customized provisioning tasks; and
   configuring, by the processor, the orchestration script to include the customized provisioning tasks.

7. The method of claim 1, further comprising:
   determining, by the processor, whether a physical resource is available for hosting the component; and
   based on a determination that the physical resource is not available for hosting the component, generating, by the processor, a procurement request to make the physical resource available.

8. A computer system comprising:
   a processor; and
   a memory storing computer-executable instructions that are executable by the processor for causing the computer system to:
      receive a build sheet for a computer network architecture, the build sheet comprising a component inventory for the computer network architecture and configuration information usable to provision the computer network architecture;
      generate a build ticket for a component of the component inventory, the build ticket comprising a portion of the configuration information usable to provision the component, the build ticket being separate from the build sheet;
      determine, using the build ticket, an orchestration script for provisioning the component, the orchestration script comprising provisioning tasks corresponding to the portion of the configuration information, the orchestration script being separate from the build ticket; and execute the orchestration script to provision the component.

9. The computer system of claim 8, wherein the memory stores additional instructions that are executable by the processor for causing the computer system to further:

receive an indication that the component was successfully provisioned;

responsive to the indication, determine, using the build sheet, a related component of the component inventory, the related component being dependent on the component being successfully provisioned;

generate an additional build ticket for the related component of the component inventory, the additional build ticket comprising another portion of the configuration information usable to provision the related component; and mark the build ticket as complete.

10. The computer system of claim 8, wherein generating the build ticket comprises:

determining, by the processor using the build sheet, a dependency of an additional component of the component inventory on the component;

selecting, by the processor and based on the dependency, the component from the component inventory;

determining, by the processor, the portion of the configuration information corresponding to the component; and configuring, by the processor, the build ticket to include the portion of the configuration information.

11. The computer system of claim 8, wherein generating the build ticket comprises:

determining, by the processor, a physical resource available for hosting the component; and determining, by the processor, the portion of the configuration information corresponding to a configuration of the physical resource.

12. The computer system of claim 11, wherein the build sheet is generated using a network design application having a drag and drop canvas, the network design application including template objects representing computer infrastructure components of the component inventory, each template object comprising a configuration of the corresponding computer infrastructure component and being individually positionable on the drag and drop canvas.

13. The computer system of claim 8, wherein determining the orchestration script based on the build ticket comprises:

determining, by the processor, whether the component is a nonstandard component;

based on a determination that the component is the nonstandard component, sending, by the processor, a request for customized provisioning tasks;

receiving, by the processor, the customized provisioning tasks; and configuring, by the processor, the orchestration script to include the customized provisioning tasks.

14. The computer system of claim 8, wherein the memory stores additional instructions that are executable by the processor for causing the computer system to further:

determine whether a physical resource is available for hosting the component; and based on a determination that the physical resource is not available for hosting the component, generate a procurement request to cause the physical resource to become available.

15. A non-transitory computer-readable storage medium storing instructions that are executable by a processor for causing a computer system to:

receive a build sheet for a computer network architecture, the build sheet comprising a component inventory for the computer network architecture and configuration information usable to provision the computer network architecture;

generate a build ticket for a component of the component inventory, the build ticket comprising a portion of the configuration information usable to provision the component, the build ticket being separate from the build sheet;

determine, using the build ticket, an orchestration script for provisioning the component, the orchestration script comprising provisioning tasks corresponding to the portion of the configuration information, the orchestration script being separate from the build ticket; and execute the orchestration script to provision the component.

16. The non-transitory computer-readable storage medium of claim 15, further comprising instructions that are executable by the processor for causing the computer system to further:

receive an indication that the component was successfully provisioned;

responsive to the indication, determine, using the build sheet, a related component of the component inventory, the related component being dependent on the component being successfully provisioned;

generate an additional build ticket for the related component of the component inventory, the additional build ticket comprising another portion of the configuration information usable to provision the related component; and mark the build ticket as complete.

17. The non-transitory computer-readable storage medium of claim 15, wherein generating the build ticket comprises:

determining, using the build sheet, a dependency of an additional component of the component inventory on the component;

selecting, based on the dependency, the component from the component inventory;

determining the portion of the configuration information corresponding to the component; and configuring the build ticket to include the portion of the configuration information.

18. The non-transitory computer-readable storage medium of claim 15, wherein generating the build ticket comprises:

determining a physical resource available for hosting the component; and determining the portion of the configuration information corresponding to a configuration of the physical resource.

19. The non-transitory computer-readable storage medium of claim 18, wherein the build sheet is generated using a network design application having a drag and drop canvas, the network design application including template objects representing computer infrastructure components of the component inventory, each template object comprising a configuration of the corresponding computer infrastructure component and being individually positionable on the drag and drop canvas.

20. The non-transitory computer-readable storage medium of claim 15, wherein determining the orchestration script based on the build ticket comprises:
- determining whether the component is a nonstandard component;
- based on a determination that the component is the nonstandard component, sending a request for customized provisioning tasks;
- receiving the customized provisioning tasks; and
- configuring the orchestration script to include the customized provisioning tasks.

* * * * *